(12) United States Patent
Hottmann (10) Patent No.: US 11,531,145 B2
(45) Date of Patent: Dec. 20, 2022

(54) DEVICE FOR AN IMAGE ACQUISITION SYSTEM

(71) Applicant: MOTHERSON INNOVATIONS COMPANY LIMITED, London (GB)

(72) Inventor: Philipp Hottmann, Remshalden (DE)

(73) Assignee: Motherson Innovations Company Limited, London (GB)

( * ) Notice: Subject to any disclaimer, the term of this patent is extended or adjusted under 35 U.S.C. 154(b) by 380 days.

(21) Appl. No.: 16/812,587

(22) Filed: Mar. 9, 2020

(65) Prior Publication Data

US 2021/0278570 A1 Sep. 9, 2021

(51) Int. Cl.
| G02B 5/00 | (2006.01) |
| B60R 11/04 | (2006.01) |
| G02B 27/00 | (2006.01) |
| B60R 11/00 | (2006.01) |

(52) U.S. Cl.
CPC .............. *G02B 5/003* (2013.01); *B60R 11/04* (2013.01); *G02B 27/0006* (2013.01); *B60R 2011/0066* (2013.01); *B60R 2011/0071* (2013.01); *B60R 2011/0077* (2013.01)

(58) Field of Classification Search
CPC ..... G02B 5/003; G02B 27/0006; B60R 11/04; B60R 2011/0066; B60R 2011/0071; B60R 2011/0077
USPC ....................................................... 359/509
See application file for complete search history.

(56) References Cited

U.S. PATENT DOCUMENTS

| 5,136,326 A * | 8/1992 | Yokota ..................... G01J 1/04 396/274 |
| 5,200,793 A | 4/1993 | Ulich et al. |
| 7,777,787 B2 | 8/2010 | Hakola et al. |
| 2019/0113742 A1* | 4/2019 | Gaucher ................ G02B 27/01 |
| 2019/0196133 A1* | 6/2019 | Park ......................... G02B 7/02 |
| 2019/0381952 A1* | 12/2019 | Wang ................... H05K 1/0274 |
| 2021/0263257 A1* | 8/2021 | Chang ................... G02B 7/003 |

FOREIGN PATENT DOCUMENTS

| WO | WO 2013/055246 A2 | 4/2013 |
| WO | WO 2016/209877 A1 | 12/2016 |

OTHER PUBLICATIONS

International Search Report and Written Opinion of the International Searching Authority, PCT/EP2018/070461, dated Oct. 23, 2018.

* cited by examiner

*Primary Examiner* — Allen C Wong
(74) *Attorney, Agent, or Firm* — Jones Day (57) ABSTRACT

A device for use with a vehicle-mounted image acquisition unit includes a main body. The main body includes a first end and a second end opposite to the first end. The main body further defines an interior cavity extending between the first end and the second end, and a plurality of apertures therethrough between the first end and the second end. The first end of the main body is configured to be disposed at or near the vehicle-mounted image acquisition unit. The vehicle-mounted image acquisition unit has a field of view extending through the interior cavity and through the second end to an outside environment surrounding a vehicle.

21 Claims, 11 Drawing Sheets

DEVICE FOR AN IMAGE ACQUISITION SYSTEM

TECHNICAL FIELD

The present disclosure relates generally to a device for an image acquisition unit, and more specifically to a device for use with a vehicle-mounted image acquisition unit.

BACKGROUND

Vehicles may include one or more image acquisition units. An image captured by the image acquisition unit may include additional information for alerting or informing a driver. Stray light emitted from a region other than a region of interest often sets a working limit on a dynamic range of an imaging system and limits signal-to-noise ratio or contrast ratio. Further, lens of such image acquisition units may easily catch contaminants, such as, dust, dirt, snow, water droplets, and other environmental debris. This may adversely impact normal operation of the image acquisition units.

SUMMARY

In one aspect, there is provided a device for use with a vehicle-mounted image acquisition unit. The device includes a main body. The main body includes a first end and a second end opposite to the first end. The main body further defines an interior cavity extending between the first end and the second end, and a plurality of apertures therethrough between the first end and the second end. The first end of the main body is configured to be disposed at or near the vehicle-mounted image acquisition unit. The vehicle-mounted image acquisition unit has a field of view extending through the interior cavity and through the second end to an outside environment surrounding a vehicle.

In an example, the main body may be substantially cone-shaped such that the main body diverges from the first end toward the second end.

In an example, the plurality of apertures may be arranged in a plurality of circumferential rows spaced apart from each other along a length of the main body.

In an example, the main body may further include a plurality of stepped sections disposed adjacent to each other.

In an example, the plurality of stepped sections may be defined on an inner surface of the main body.

In an example, the main body may further define a longitudinal axis along its length. An aperture axis of each aperture may be inclined relative to the longitudinal axis of the main body.

In an example, at least one aperture from the plurality of apertures may be cone-shaped along its length.

In an example, each aperture may have a circular cross-section.

In an example, the first end of the main body may be secured to the vehicle-mounted image acquisition unit by at least one of adhesive, fasteners and a ring mount.

In an example, the device may further include a flow unit configured to generate flow of a fluid within the interior cavity such that the fluid may be discharged through the plurality of apertures.

In an example, the main body may include a material including at least one of glass-filled nylon, nylon 66, polycarbonate (PC), acrylonitrile butadiene styrene (ABS) and polycarbonate-acrylonitrile butadiene styrene (PC-ABS).

In another aspect, there is provided an image acquisition system for use with a vehicle. The image acquisition system includes an image acquisition unit mounted on the vehicle and a device including a main body. The main body includes a first end and a second end opposite to the first end. The main body further defines an interior cavity extending between the first end and the second end, and a plurality of apertures therethrough between the first end and the second end. The first end of the main body is configured to be disposed at or near the image acquisition unit. The image acquisition unit has a field of view extending through the interior cavity and through the second end to an outside environment surrounding the vehicle.

In an example, the image acquisition unit may include at least one of cameras, sensors, image sensors, optical sensors, laser sensors and scanners.

In an example, the main body may be substantially cone-shaped such that the main body diverges from the first end toward the second end.

In an example, the plurality of apertures may be arranged in a plurality of circumferential rows spaced apart from each other along a length of the main body.

In an example, the main body may further include a plurality of stepped sections disposed adjacent to each other.

In an example, the main body may further define a longitudinal axis along its length. An aperture axis of each aperture may be inclined relative to the longitudinal axis of the main body.

In an example, at least one aperture from the plurality of apertures may be cone-shaped along its length.

In an example, the first end of the main body may be secured to the image acquisition unit by at least one of adhesive, fasteners and a ring mount.

In one aspect, there is provided a device for use with a vehicle-mounted image acquisition unit. The device includes a main body. The main body includes a first end, a second end opposite to the first end, and a plurality of stepped sections disposed between the first end and the second end. The main body further defines an interior cavity extending between the first end and the second end, and a plurality of apertures therethrough between the first end and the second end. The first end of the main body is configured to be secured to the vehicle-mounted image acquisition unit. The vehicle-mounted image acquisition unit has a field of view extending through the interior cavity and through the second end to an outside environment surrounding a vehicle.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

Figure 1:
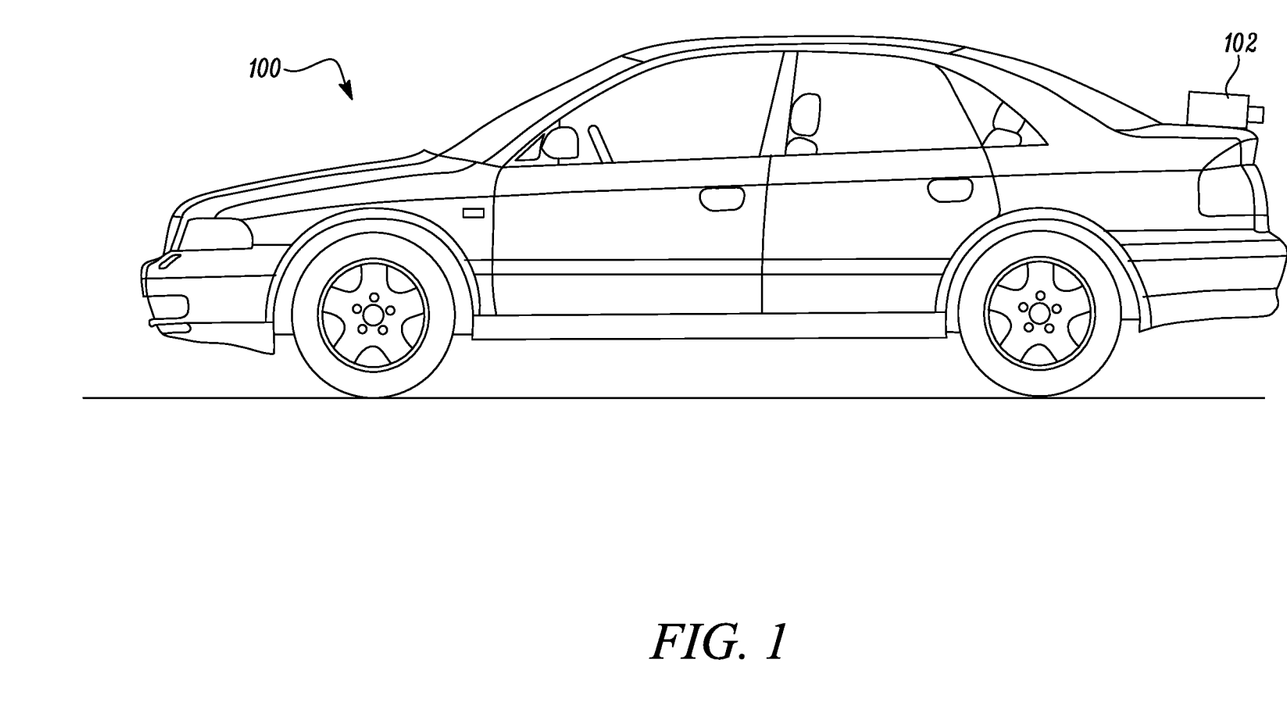
FIG. 1 illustrates a schematic side view of an example of a vehicle having a vehicle-mounted image acquisition unit.

Referring now to the Figures, FIG. 1 illustrates an example of a vehicle 100. An image acquisition unit 102 is mounted on the vehicle 100. The image acquisition unit 102 may be interchangeably referred to as a vehicle-mounted image acquisition unit 102. The vehicle-mounted image acquisition unit 102 may be provided at any location on the vehicle 100, for example, a rear of the vehicle 100, a side of the vehicle 100, a front of the vehicle 100, and so forth. The vehicle-mounted image acquisition unit 102 may provide images based on the requirements of a driver or an occupant of the vehicle 100. The images provided by the vehicle-mounted acquisition unit 102 may also be used in any ADAS, machine vision, automated driving or other function as required by vehicle systems. In an example, the vehicle-mounted image acquisition unit 102 may help the driver to view areas rear of the vehicle 100. In another example, the vehicle-mounted image acquisition unit 102 may help the driver to view areas to the side of the vehicle 100. In some examples, the vehicle-mounted image acquisition unit 102 may process image data to detect objects, such as objects to the rear of the vehicle 100 during a reversing maneuver. In some examples, the vehicle-mounted image acquisition unit 102 may be used to detect vehicles, such as approaching or following vehicles, or vehicles at a side lane adjacent to the vehicle 100. The vehicle-mounted image acquisition unit 102 may also enable the driver to view areas in a blindspot. The vehicle-mounted image acquisition unit 102 may be fixedly or adjustably mounted on the vehicle 100. The vehicle-mounted image acquisition unit 102 may be configured to acquire both still images and moving images (e.g., video). Further, the vehicle-mounted image acquisition unit 102 may include at least one of cameras, sensors, image sensors, optical sensors, laser sensors and scanners. The vehicle-mounted image acquisition unit 102 may further include a lens (not shown).

Though one vehicle-mounted image acquisition unit 102 is shown in FIG. 1, multiple vehicle-mounted image acquisition units may be disposed at different locations on the vehicle 100. The vehicle-mounted image acquisition unit 102 may process and provide images at a display device (not shown) for viewing by the driver of the vehicle 100. The display device may include any type of device including a display, for example, but not limited to, a display in an instrument panel of the vehicle 100, a head-up display (HUD), a smartphone, a tablet computer, a rearview or a sideview mirror including a display, and so forth. The display device may be fixedly or adjustably mounted inside or outside the vehicle 100. In some cases, the display device may simultaneously or selectively display multiple images from multiple vehicle-mounted image acquisition units 102.

Although the vehicle 100 is illustrated as a passenger car in FIG. 1, the vehicle-mounted image acquisition unit 102 may be used with other types of vehicles, for example, buses, trucks, off-road vehicles, motorcycles, aircrafts, bicycles, trams, locomotives, heavy-duty vehicles used in construction and earthworking, and so forth.

Figure 2A:
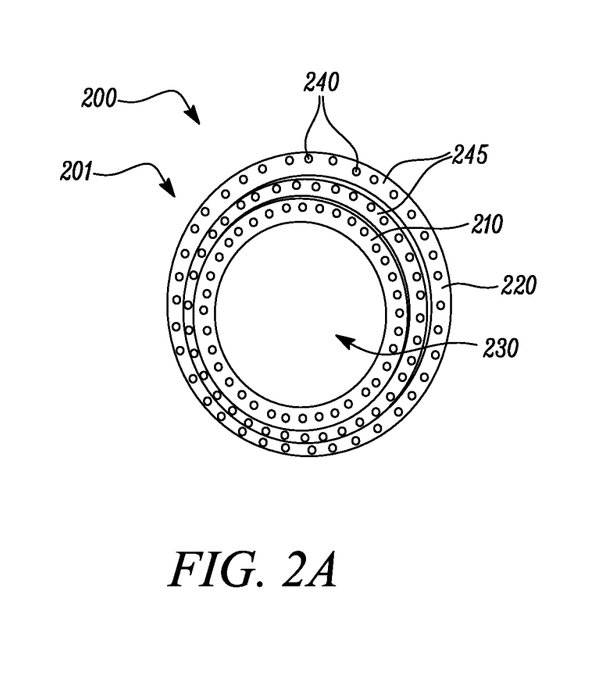
FIGS. 2A and 2B illustrate a front view and a perspective view, respectively, of an example of a device associated with the vehicle-mounted image acquisition unit.
Figure 2B:
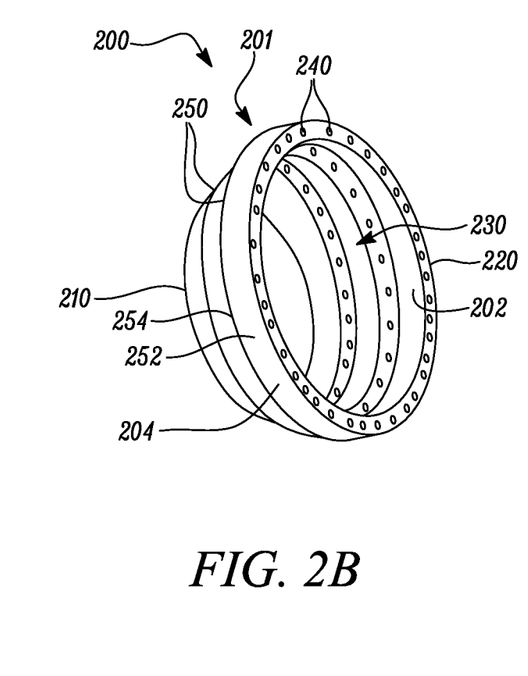
Figure 2C:
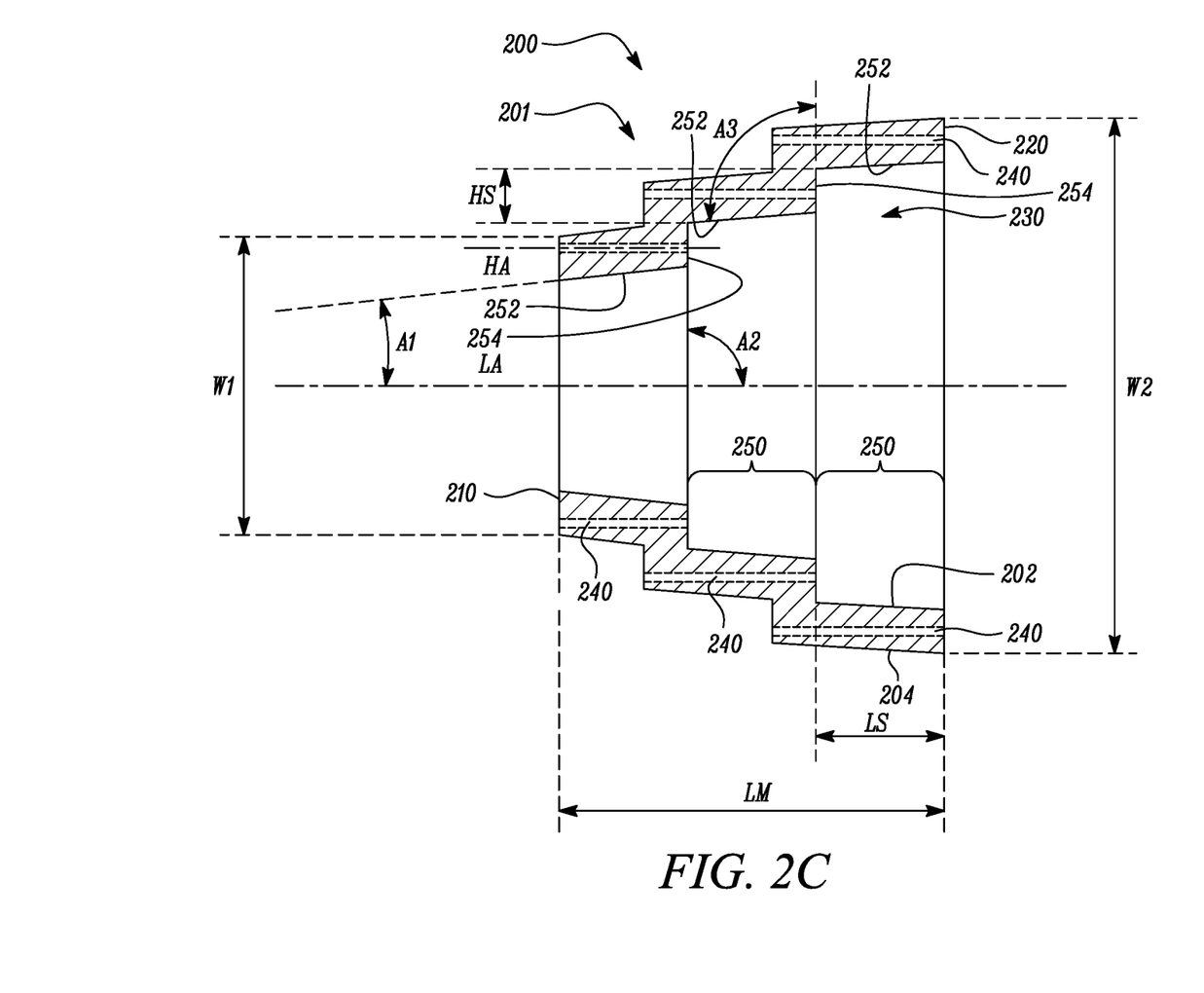
FIG. 2C illustrates a sectional side view of the device of FIGS. 2A and 2B.

FIGS. 2A and 2B illustrate a front view and a side view, respectively, of a device 200 for use with a vehicle-mounted image acquisition unit, such as the vehicle-mounted image acquisition unit 102 described with reference to FIG. 1. FIG. 2C illustrates a sectional side view of the device 200. The device 200 is a stray light-reducing device for use with the vehicle-mounted image acquisition unit 102. The device 200 may reduce background and side incident light (hereinafter referred to as "stray light"). Referring to FIGS. 2A, 2B and 2C, the device 200 includes a main body 201 including a first end 210 and a second end 220 opposite to the first end 210. The main body 201 defines an interior cavity 230 extending between the first end 210 and the second end 220. The first end 210 of the main body 201 is configured to be disposed at or near the vehicle-mounted image acquisition unit 102 (shown in FIG. 3B). In some examples, the first end 210 fits over the vehicle-mounted image acquisition unit 102. The vehicle-mounted image acquisition unit 102 has a field of view extending through the interior cavity 230 and through the second end 220 to an outside environment surrounding the vehicle 100 (shown in FIG. 3B). In some examples, the main body 201 provides the vehicle-mounted image acquisition unit 102 with a wide field of view to the outside environment surrounding the vehicle 100.

In some examples, the main body 201 is substantially cone-shaped such that the main body 201 diverges from the first end 210 toward the second end 220. The main body 201 has a first width "W1" at the first end 210 and a second width "W2" at the second end 220. The first width "W1" is less than the second width "W2". In some examples, a ratio between the first width "W1" and the second width "W2" is about 1:1.5, 1:2, 1:2.5, 1:3, 1:4, or 1:5. In some examples, at least two opposing surfaces of the interior cavity 230 diverge relative to one another from the first end 210 of the main body 201 toward the second end 220 of the main body 201. The main body 201 defines a longitudinal axis "LA" along its length "LM". In some examples, the length "LM" of the main body 201 may be increased to further reduce stray light travelling to the vehicle-mounted image acquisition unit 102. However, by increasing the length "LM" of the main body 201, the main body 201 may be more susceptible to contaminants, such as dust, dirt, snow, water droplets, and other environmental debris. In some examples, the length "LM" of the main body 201 may be from about 5 centimeters (cm) to about 20 cm. In some other examples, the length "LM" of the main body 201 may be more than about 20 cm. The length "LM" of the main body 201 is exemplary, and may be varied as per desired application attributes.

In an example, the main body 201 has an annular cross-section. In other examples, the main body 201 may have an oval, a square, a rectangular, a triangular, or a polygonal cross-section. In some examples, the main body 201 may have an inner surface 202 and an outer surface 204. In some examples, the inner surface 202 of the main body 201 may be black-colored and/or have a matte surface finish for maximum light absorption. The inner surface 202 includes any geometry to reduce stray light travelling to the vehicle-mounted image acquisition unit 102. In some examples, the inner surface 202 may have a circular, an oval, a square, a rectangular, a triangular, or a polygonal cross-section. In some examples, the outer surface 204 may include any geometry to match aerodynamic requirements of the vehicle 100. In some examples, the outer surface 204 may have a circular, an oval, a square, a rectangular, a triangular, or a polygonal cross-section.

In some examples, the main body 201 includes a material including at least one of glass-filled nylon, nylon 66, polycarbonate (PC), acrylonitrile butadiene styrene (ABS) and polycarbonate-acrylonitrile butadiene styrene (PC-ABS). In some examples, the main body 201 includes an elastic and/or a flexible material.

In some examples, the main body 201 further includes a plurality of stepped sections 250 disposed adjacent to each other. The stepped sections 250 are defined on the inner surface 202 of the main body 201. The outer surface 204 may also include similar stepped sections. The plurality of stepped sections 250 are spaced apart from each other along the longitudinal axis "LA" of the main body 201. The plurality of stepped sections 250 are disposed between the first end 210 and the second end 220. The plurality of stepped sections 250 on the inner surface 202 may reduce stray light travelling to the lens of the vehicle-mounted image acquisition unit 102. In the illustrated examples, the device 200 includes two stepped sections 250. However, the number of stepped sections 250 may vary as per desired application attributes.

Each stepped section 250 of the plurality of stepped sections 250 includes two edges 252 and 254. Further, the inner surface 202 of the main body 201 includes one additional edge 252 extending from the first end 210 and disposed adjacent to the one of the stepped sections 250. The edges 252, 254 may extend along a circumference of the inner surface 202 of the main body 201. Edge 252 may be substantially parallel along the longitudinal axis "LA" of the main body 201. Edge 254 may be substantially perpendicular to the longitudinal axis "LA" of the main body 201. In some examples, the plurality of stepped sections 250 may be substantially L-shaped. In some examples, the edge 252 may be inclined relative to the longitudinal axis "LA" of the main body 201. In some examples, an angle A1 between the edge 252 and the longitudinal axis "LA" of the main body 201 may be less than about 10 degrees. In some other examples, the angle A1 between the edge 252 and the longitudinal axis "LA" of the main body 201 may be from about 10 degrees to about 60 degrees. In some examples, an angle A2 between the edge 254 and the longitudinal axis "LA" of the main body 201 may be from about 30 degrees to about 90 degrees. In some other examples, the angle A2 between the edge 254 and the longitudinal axis "LA" of the main body 201 may be less than about 30 degrees. In some examples, an angle A3 between the edge 252 and the edge 254 may be from about 70 degrees to about 120 degrees. In some other examples, the angle A3 between the edge 252 and the edge 254 may be less than about 70 degrees. In some examples, the plurality of stepped sections 250 may be present only on the inner surface 202 of the main body 201.

Each edge 252 has a length "LS". In some examples, the lengths "LS" of the edges 252 may be equal to one another. In some other examples, the lengths "LS" of the edges 252 may be different from each other. Each edge 254 has a height "HS". In some examples, the heights "HS" of the edges 254 may be equal to one another. In some other examples, the heights "HS" of the edges 254 may be different from each other. In some examples, a ratio between the length "LS" and the height "HS" ratio may be 1:1, 1.5:1, 2:1, 3:1, or 4:1. The ratio selected may also be selected based on a field of view "FOV" (shown in FIG. 7) of the image acquisition unit 102.

Stray light may be considerably reduced by optimizing the parameters, such as the length "LS" and the height "HS" of the edges 252, 254, respectively, and the angle A3 between the edges 252, 254.

In order to remove any contaminants from the interior cavity 230 of the device 200, the main body 201 further defines a plurality of apertures 240 therethrough between the first end 210 and the second end 220. In some examples, the plurality of apertures 240 are arranged in a plurality of circumferential rows 245 spaced apart from each other along the length "LM" of the main body 201. In other words, the circumferential rows 245 are spaced apart from each other along the longitudinal axis "LA" of the main body 201. The position of the plurality of apertures 240 may be chosen such that stray light from the outside environment surrounding the vehicle 100 does not enter the interior cavity 230 of the device 200 through the plurality of apertures 240. In the illustrated example, the plurality of apertures 240 are present in each of the edges 254 and extend substantially along the length "LM" of the main body 201. Specifically, a set of apertures 240 start from each edge 254 and extends through the main body 201. Further, another set of apertures 240 start from the second end 220 and extends through the main body 201. In some other examples, the plurality of apertures 240 are alternatively or additionally present in each of the edges 252, 254 and are inclined to the longitudinal axis "LA" of the main body 201. In some examples, two or more of the plurality of apertures 240 may be in fluid communication with each other. The main body 201 defines an aperture axis "HA" of each aperture 240. In the illustrated example, the aperture axis "HA" of each aperture 240 is substantially parallel to the longitudinal axis "LA" of the main body 201.

In some examples, each aperture 240 has a circular cross-section. In some examples, a diameter of each aperture 240 may be from about 1 millimeter (mm) to about 10 mm.

In some other examples, the diameter of each aperture 240 may be less than about 1 mm. In other examples, one or more of the apertures 240 may have an oval, a square, a rectangular, a triangular, or a polygonal cross-section. The plurality of apertures 240 may be drilled or molded in the main body 201. A density of the apertures 240 may be in a range of about 5 to 100 apertures per cm². The diameter, the shape, and the density of the plurality of apertures 240 are exemplary, and may be varied as per desired application attributes. For example, the diameter, shape, and density of the plurality of apertures 240 may be varied based on the type of the vehicle-mounted image acquisition unit 102 and the mount location of the vehicle-mounted image acquisition unit 102. Moreover, the diameter, shape, and density of the plurality of apertures 240 may be varied such that stray light from the outside environment surrounding the vehicle 100 does not enter the interior cavity 230 of the device 200 through the plurality of apertures 240.

An airflow from the first end 210 or the second end 220 may be generated from the movement of the vehicle 100 (e.g., while driving). In operation, as the vehicle 100 moves forward or backward, the airflow is generated that flows into the device 200. This airflow within the interior cavity 230 of the main body 201 is at least partially expelled through the plurality of apertures 240 and removes the contaminants, such as loose dirt or debris, that may have accumulated on the lens or in the interior cavity 230. In other words, the airflow blows the contaminants off the lens and the interior cavity 230 through the plurality of apertures 240 in the main body 201. In some examples, the airflow may be artificially generated by a flow unit (shown in FIG. 8) to discharge the contaminants through the plurality of apertures 240. In some examples, a water mister may also be included in cooperation with the airflow from the movement of the vehicle 100 and/or the flow unit.

Figure 3A:
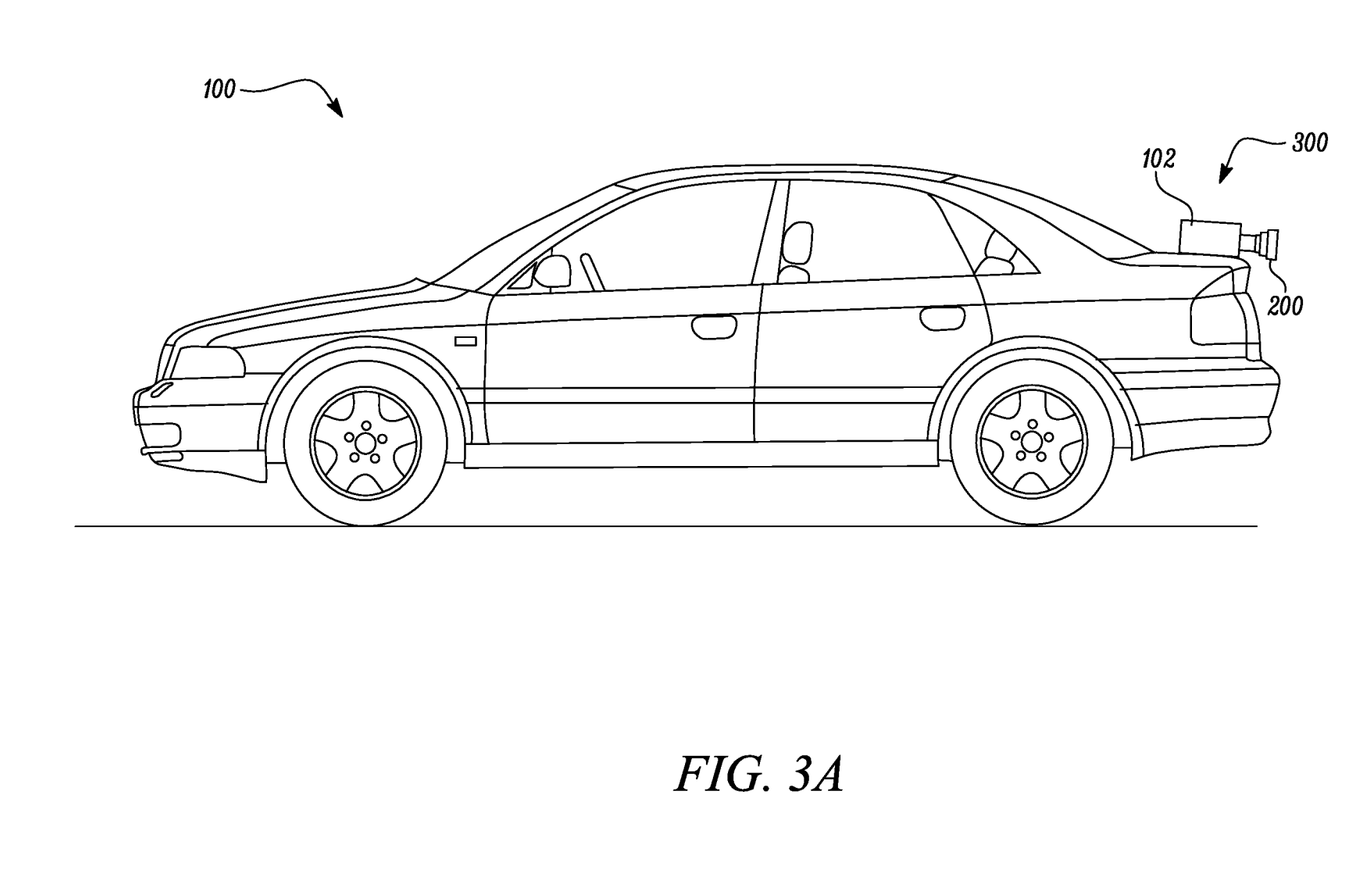
FIG. 3A illustrates the device secured to the vehicle-mounted image acquisition unit.

FIG. 3A illustrates an image acquisition system 300 for use with the vehicle 100. The image acquisition system 300 includes the image acquisition unit 102 and the device 200. In the illustrated example, the device 200 is secured to the vehicle-mounted image acquisition unit 102. In some examples, the device 200 may be removably attached to the vehicle-mounted image acquisition unit 102. The first end 210 of the main body 201 is secured to the vehicle-mounted image acquisition unit 102 by at least one of adhesive, fasteners and a ring mount. In some other examples, the device 200 may be an integral component of the vehicle-mounted image acquisition unit 102.

Figure 3B:
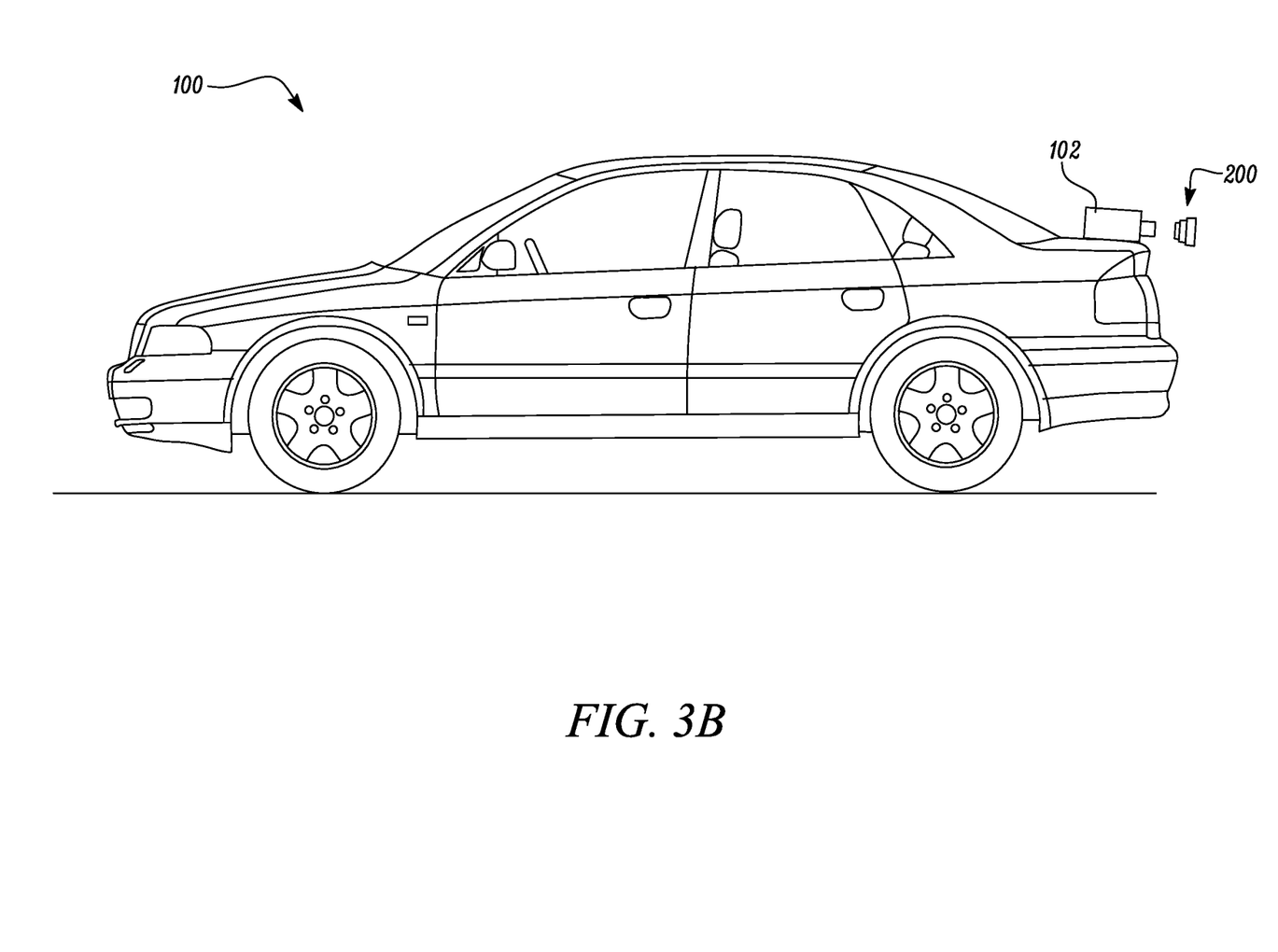
FIG. 3B illustrates the device removed from the vehicle-mounted image acquisition unit.

FIG. 3B illustrates the device 200 removed from the vehicle-mounted image acquisition unit 102. In some examples, the device 200 may be removed from the vehicle-mounted image acquisition unit 102 for cleaning purposes.

Figure 4A:
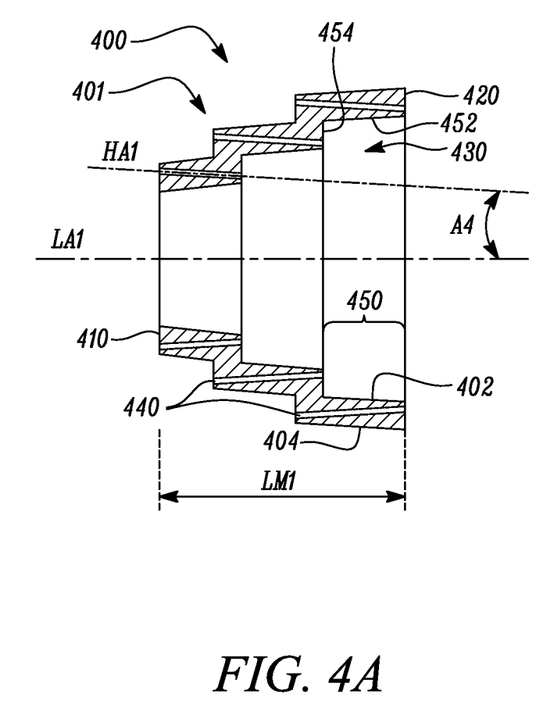
FIGS. 4A and 4B illustrate sectional side views of different examples of the device.
Figure 4B:
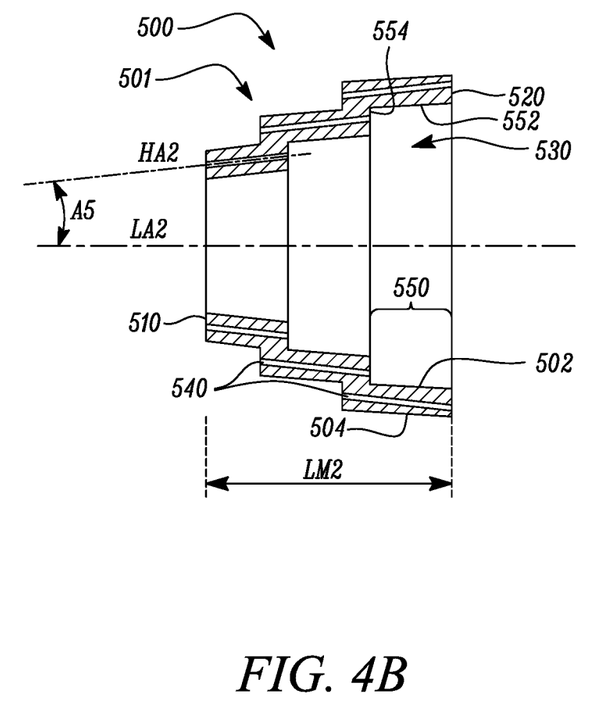

FIGS. 4A and 4B illustrate sectional side views of other exemplary devices 400, 500, respectively. FIG. 4A illustrates the device 400 similar to the device 200 shown of FIGS. 2A, 2B and 2C, with each of features 401 to 454 corresponding to equivalent features 201 to 254 of the device 200. The main body 401 defines a longitudinal axis "LA1" along its length "LM1", and an aperture axis "HA1" of each aperture 440. In some examples, the aperture axis "HA1" of each aperture 440 is inclined relative to the longitudinal axis "LA1" of the main body 401. In the illustrated example, the aperture axis "HA1" of each aperture 440 is inclined toward the second end 420. In some examples, an angle A4 between the aperture axis "HA1" and the longitudinal axis "LA1" may be from about 10 degrees to about 60 degrees. In some other examples, the angle A4 between the aperture axis "HA1" and the longitudinal axis "LA1" may be less than about 10 degrees. The angle A4 between the aperture axis "HA1" and the longitudinal axis "LA1" may be chosen such that the angle A4 enhances the egress of the contaminants from the interior cavity 430 of the main body 401.

FIG. 4B illustrates the device 500 similar to the device 200 shown of FIGS. 2A, 2B and 2C, with each of features 501 to 554 corresponding to equivalent features 201 to 254 of the device 200. The main body 501 defines a longitudinal axis "LA2" along its length "LM2", and an aperture axis "HA2" of each aperture 540. In some examples, the aperture axis "HA2" of each aperture 540 is inclined relative to the longitudinal axis "LA2" of the main body 501. In the illustrated example, the aperture axis "HA2" of each aperture 540 is inclined toward the first end 510. In some examples, an angle A5 between the aperture axis "HA2" and the longitudinal axis "LA2" may be from about 10 degrees to about 60 degrees. In some other examples, the angle A5 between the aperture axis "HA2" and the longitudinal axis "LA2" may be less than about 10 degrees. The angle A5 between the aperture axis "HA2" and the longitudinal axis "LA2" may be chosen such that the angle A5 enhances the egress of the contaminants from the interior cavity 530 of the main body 501.

Figure 5A:
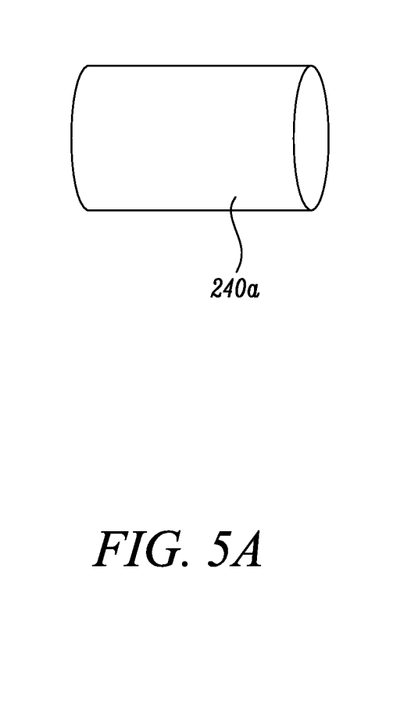
FIGS. 5A, 5B and 5C illustrate different examples of apertures of the device.
Figure 5B:
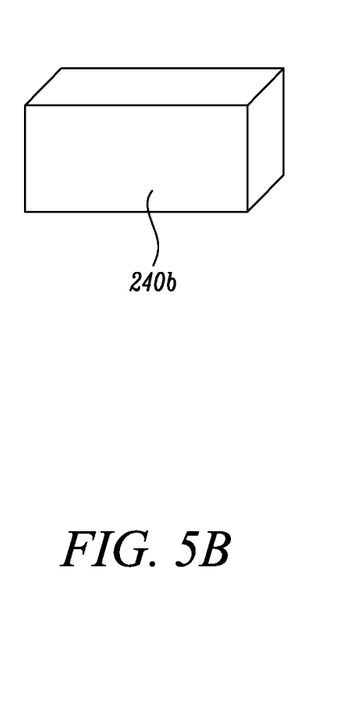
Figure 5C:
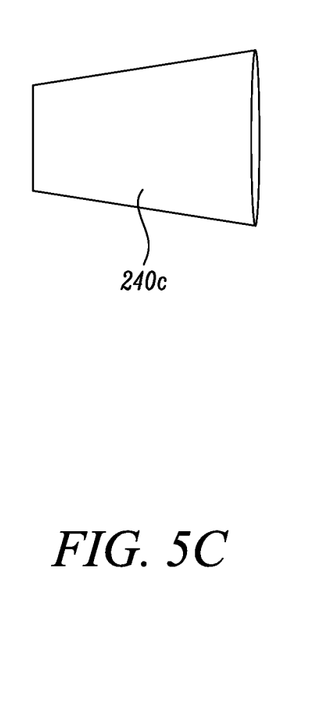

FIGS. 5A, 5B, 5C illustrate different shapes of each aperture 240 of the device 200 (shown in FIGS. 2A-2C). FIG. 5A illustrates an aperture 240a that is cylindrical along its length. FIG. 5B illustrate an aperture 240b that is substantially cuboidal along its length. FIG. 5C illustrate an aperture 240c that is cone-shaped along its length. In this example, the aperture 240c may act like a nozzle to improve discharge of the contaminants.

FIGS. 6A, 6B, 6C, 6D, and 6E illustrate different examples of securing the device 200 to the vehicle-mounted image acquisition unit 102 (shown in FIG. 1).

Figure 6A:
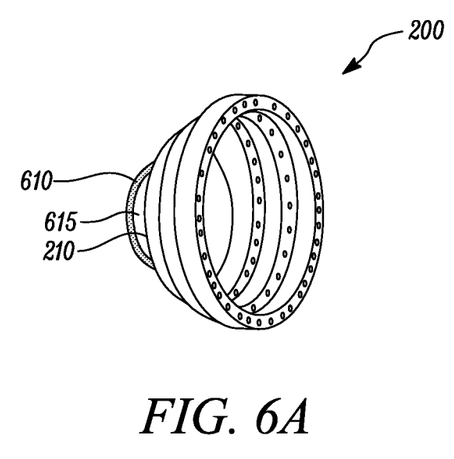
FIGS. 6A, 6B, 6C, 6D and 6E illustrate different examples of securing the device to the vehicle-mounted image acquisition unit.

FIG. 6A illustrates the device 200 with an attachment portion 615 including an adhesive layer 610. The adhesive layer 610 on the attachment portion 615 adhesively engages the first end 210 with the vehicle-mounted image acquisition unit 102 (shown in FIG. 1). In some other examples, the first end 210 of the device 200 may include the adhesive layer 610 for attachment with the vehicle-mounted image acquisition unit 102.

Figure 6B:
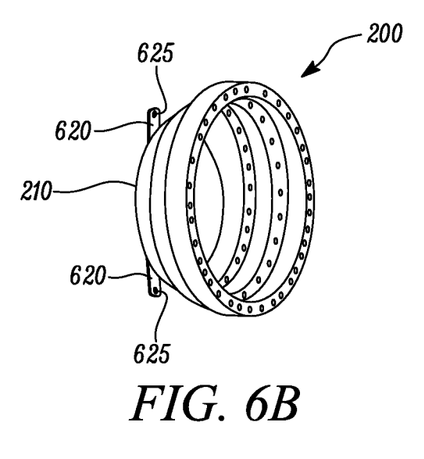

FIG. 6B illustrates the device 200 with mounting tabs 620. The first end 210 of the device 200 may include the mounting tabs 620. The mounting tabs 620 includes one or more apertures 625 therethrough for mounting the device 200 at or to the vehicle-mounted image acquisition unit 102 via suitable fasteners (not shown), for example, screws, bolts, a nut and bolt assembly, or the like.

Figure 6C:
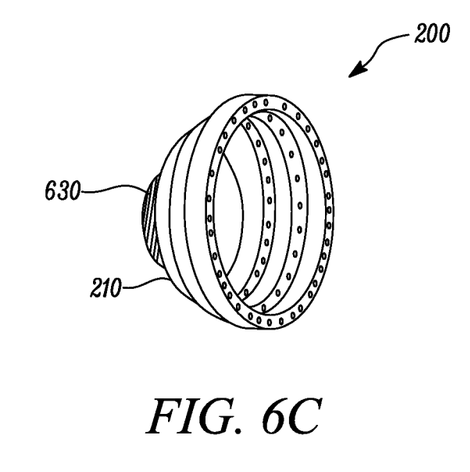

FIG. 6C illustrates the device 200 with a threaded portion 630. In some other examples, the first end 210 of the device 200 may include the threaded portion 630. FIG. 6C illustrates the device 200 with an external threaded portion 630. However, in some other examples, the first end 210 may include an internal threaded portion (not shown). The external threaded portion 630 can be threadingly engaged with an internal threaded portion (not shown) of the vehicle-mounted image acquisition unit 102. In some examples, the internal threaded portion may be formed on an inner surface of the first end 210 and can be threadingly engaged with an external threaded portion (not shown) of the vehicle-mounted image acquisition unit 102.

Figure 6D:
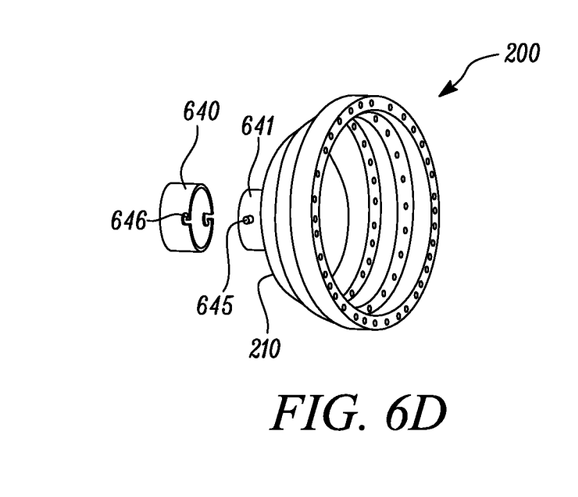

FIG. 6D illustrates the device 200 with a bayonet type mounting mechanism 640. The first end 210 of the device 200 may include an attachment portion 641 with one or more radial pins 645. In some examples, the attachment portion 641 includes two radial pins 645. However, in some other examples, the attachment portion 641 may include L-shaped slots (not shown). The radial pins 645 disposed on the attachment portion 641 can be locked with corresponding L-shaped slots 646 in the vehicle-mounted image acquisition unit 102. In some other examples, a L-shaped slot formed in the attachment portion 641 can be locked with a radial pin (not shown) in the vehicle-mounted image acquisition unit 102.

Figure 6E:
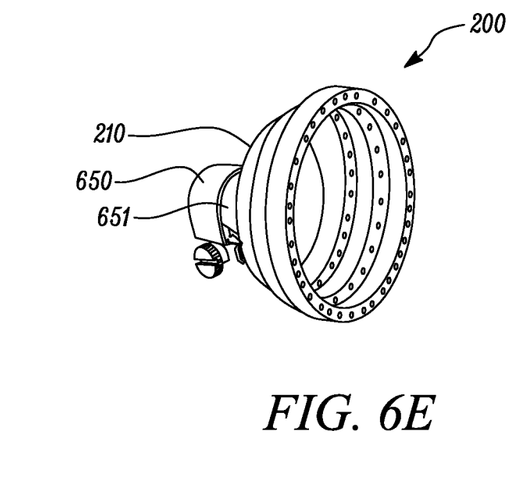

FIG. 6E illustrates a mount ring 650. The first end 210 of the device 200 may include an attachment portion 651 secured to the vehicle-mounted image acquisition unit 102 using the mount ring 650.

Figure 7:
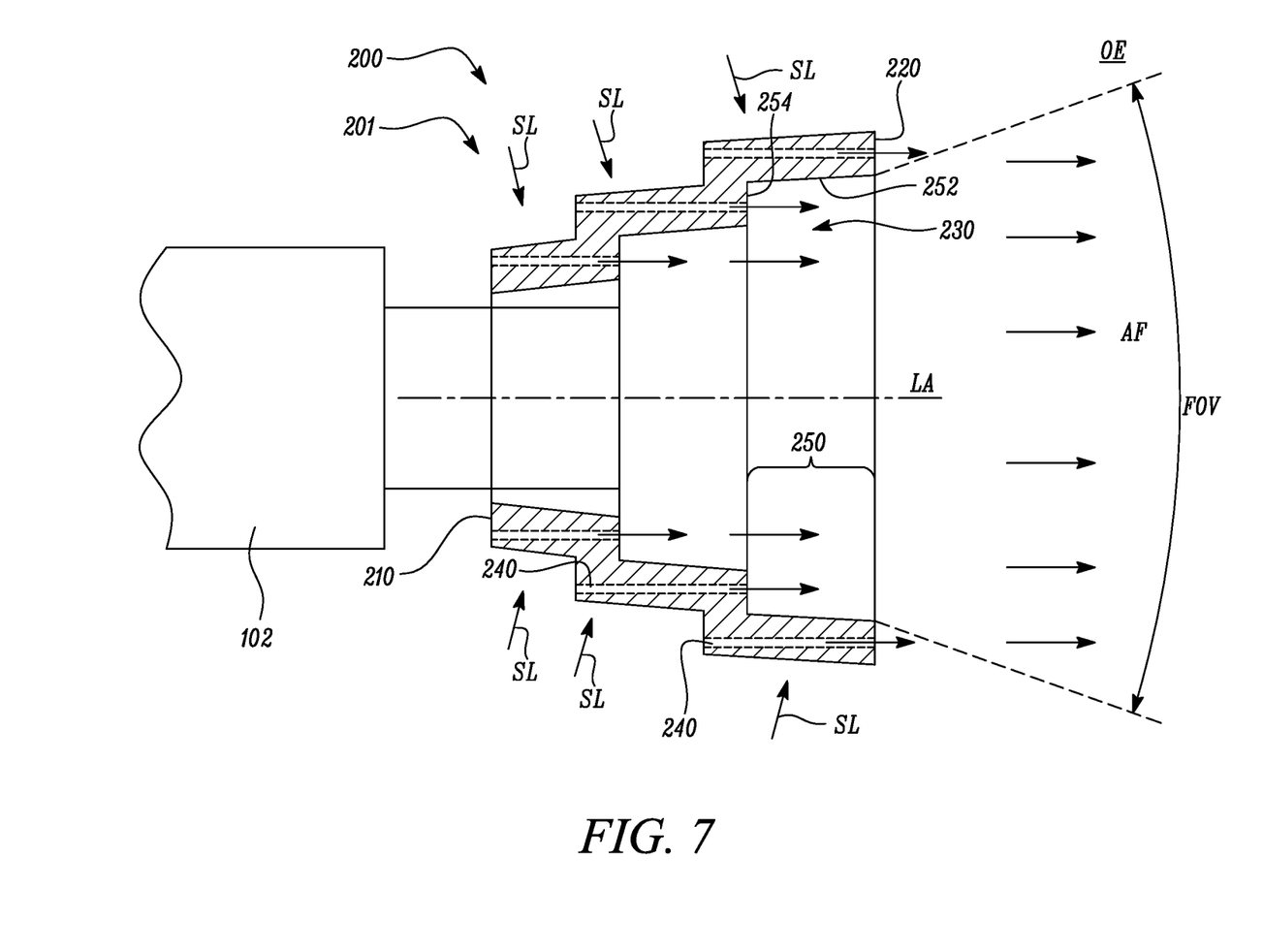
FIG. 7 illustrates an exemplary operation of the device when secured to the vehicle-mounted image acquisition unit.

FIG. 7 illustrates the device 200 mounted to the vehicle-mounted image acquisition unit 102 (partially shown in FIG. 7). The vehicle-mounted image acquisition unit 102 has the "FOV" extending through the interior cavity 230 and through the second end 220 to an outside environment "OE" surrounding the vehicle 100 (shown in FIG. 1). In some examples, the main body 201 provides the vehicle-mounted image acquisition unit 102 with a wide field of view to the outside environment "OE" surrounding the vehicle 100.

In some examples, the device 200 may substantially prevent stray light "SL" in the outside environment "OE" from interfering with the operation of the vehicle-mounted image acquisition unit 102. The plurality of stepped sections 250 defined on the inner surface 202 may reduce or eliminate stray light "SL" travelling to the lens of the vehicle-mounted image acquisition unit 102. The apertures 240 may be positioned such that stray light "SL" does not enter the interior cavity 230 of the device 200 through the apertures 240. In some examples, the apertures 240 may substantially extend along the longitudinal axis "LA" of the device 200 such that stray light "SL" cannot enter into the interior cavity 230 through the apertures 240.

An airflow "AF" flows into the device 200. In the illustrated example, the airflow "AF" flows from the first end 210. However, the airflow "AF" may alternatively or additionally flow from the second end 220. The airflow "AF" may be generated due to the movement of the vehicle 100 or by a flow unit (not shown). The airflow "AF" enters the interior cavity 230 of the main body 201 and is at least partially expelled through the apertures 240. The airflow "AF" may remove various contaminants, such as loose dirt or debris, that may have accumulated on the vehicle-mounted image acquisition unit 102 or in the interior cavity 230. The airflow "AF" may entrain the contaminants and flow the contaminants through the apertures 240 in the main body 201. The device 200 may therefore provide self-cleaning and stray-light reducing functionality upon attachment with the vehicle-mounted image acquisition unit 102.

Figure 8:
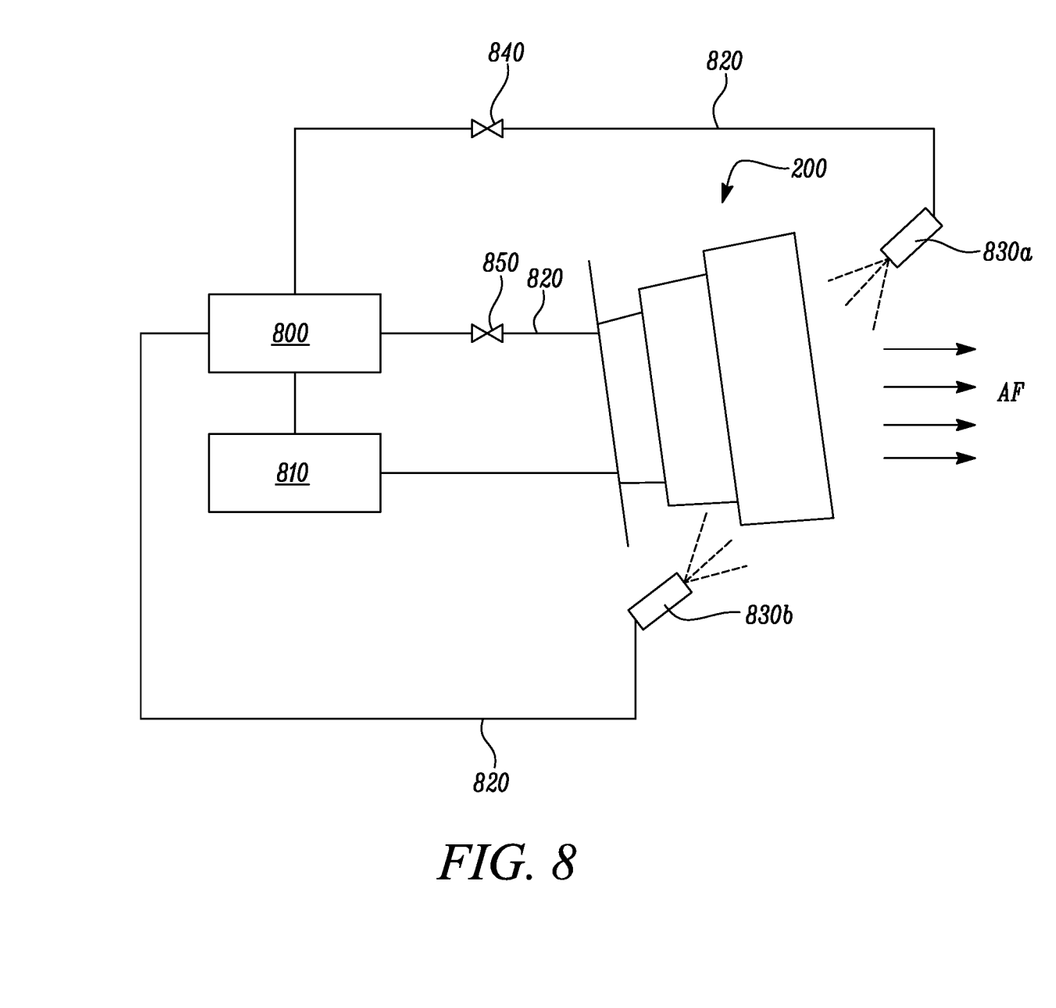
FIG. 8 illustrates an example of the device with a flow unit.

FIG. 8 illustrates the device 200 including a flow unit 800 configured to generate flow of a fluid within the interior cavity 230 (shown in FIG. 2C) such that the fluid is discharged through the plurality of apertures 240 (shown in FIG. 2C) to remove the contaminants in the device 200. In some examples, the flow unit 800 may be mounted next to the vehicle-mounted image acquisition unit 102 (shown in FIG. 1). In some other examples, the flow unit 800 may be mounted anywhere in the vehicle 100. The flow unit 800 may include one or more hoses 820 or conduits to route the fluid to the desired location in the interior cavity 230. The flow unit 800 may include one or more of a fluid tank, a fluid compressor, and a pump. In some examples, the fluid compressor may include a vehicle air compressor already in use in the vehicle 100, such as for supplying pressurized air for a suspension system, or for engine charging, brake actuating, lock actuating and/or the like.

In some examples, the flow unit 800 may further include any a nozzle, a blower, a dirt detector or a combination thereof. In some examples, the hoses 820 may be routed directly to the interior cavity 230 of the device 200. In some examples, the fluid is fed to the interior cavity 230 of the device 200 from a valve 850. In some examples, nozzles 830a, 830b may be configured to spray the interior cavity 230 of the device 200 with the fluid. In some examples, the nozzles 830a, 830b may be attached to an end of the one or more hoses 820. In some examples, the fluid is compressed air, a cleaning fluid, aerosolized fluid, or a combination thereof. In some examples, the compressed air may include any gas, such as engine or compressor exhaust, nitrogen, and the like, suitable for blowing through the device 200 to remove contaminants. In some examples, the fluid is fed to the nozzle 830a from a valve 840.

In some examples, the nozzles 830a, 830b are configured to blow air across the device 200 to blow off the contaminants, such as loose dirt or debris through the plurality of apertures 240.

In some examples, a controller 810 is communicatively coupled to the flow unit 800. In some examples, the controller 810 regulates the flow unit 800 to direct the fluid to the interior cavity 230. Further, the controller 810 may receive output signals from the dirt detector (not shown). In some examples, the controller 810 is configured to detect the contaminants in the interior cavity 230 based on the detection by the dirt detector. The dirt detector may detect the contaminants and generate electrical signals based on the detection.

In some examples, the controller 810 may provide an output to a user interface (not shown). The user interface may include the display device. In some examples, the user interface may include an audio device, a haptic device, one or more input devices (e.g., keyboard, touchscreen, keypad etc.), or combinations thereof. In some examples, the controller 810 may generate an alert or notification upon detecting the contaminants in the interior cavity 230. The alert or notification may be sent to the user interface. The alert or notification may be visual, audible, haptic, or combinations thereof.

In certain cases, the controller 810 may automatically activate the flow unit 800 upon detecting the contaminants in the interior cavity 230. In some other examples, the controller 810 is programmed to activate the flow unit 800 to supply the fluid at a scheduled time after the start-up of the vehicle 100. In some examples, the controller 810 may periodically activate the flow unit 800. In some examples, the controller 810 may analyze images captured by the vehicle-mounted image acquisition unit 102 and activate the flow unit 800 based on the image quality of the captured images. In some examples, the flow unit 800 generates a constant flow of the fluid at all times during the operation of the vehicle-mounted image acquisition unit 102. In some other examples, the flow of the fluid may be in a pulsed manner. In order to create the pulsed flow of the fluid, the controller 810 can transmit a pulse width modulated control signal to operate the flow unit 800.

The controller 810 may include a processor (not shown) and a memory (not shown). The memory may include computer executable instructions that are executable by the processor to perform a logic associated with the controller 810. In an example, the controller 810 may include analog-to-digital converters to process the signals from the various components of the flow unit 800.

The processor and the memory may be in communication with each other. The processor may be in communication with additional components. The processor may be in communication with the user interface that may indicate to the driver the presence of the contaminants in the interior cavity 230 of the device 200. In some examples, the processor may also receive inputs from the driver via the user interface to activate the flow unit 800. The controller 810 may control various parameters of the flow unit 800 based on the inputs received from the driver.

The processor may be any device that performs logic operations. The processor may include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processor may include one or more components operable to execute computer executable instructions or computer code embodied in the memory.

The logic associated with the controller 810 may be implemented in one or more modules including hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that includes instructions executable with the processor or other processor to implement one or more of the features of the module. When any one of the modules includes the portion of the memory that includes instructions executable with the processor, the module may or may not include the processor. In some examples, each module may just be the portion of the memory or other physical memory that includes instructions executable with the processor or other processor to implement the logic of the corresponding module without the module including any other hardware.

Some of the features of the controller 810 may be stored in a computer readable storage medium (for example, as logic implemented as computer executable instructions or as data structures in memory). All or part of the controller 810 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the controller 810 may be distributed among multiple entities, such as among multiple processors and memories, optionally including multiple distributed processing systems. Additionally, peripheral interfaces (not shown) may be provided. The peripheral interfaces may include analog interfaces (e.g., LVDS serial interface), digital interfaces, such as I2C, SPI, CAN, LIN, or similar digital high speed transmission interface, or Ethernet to connect the controller 810 to other devices, for example, the display device.

Figure 9:
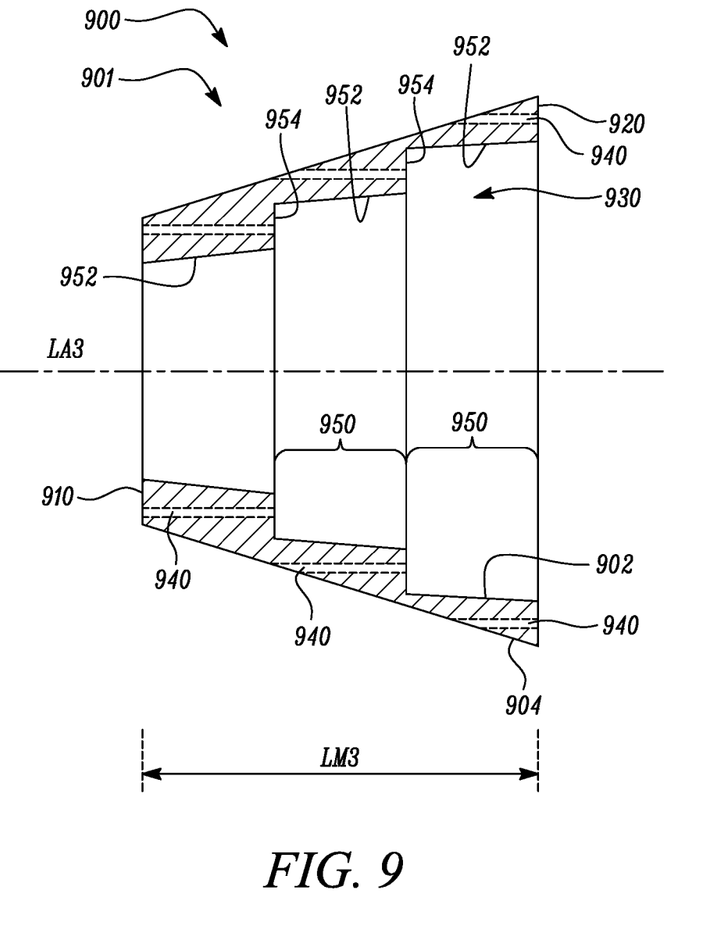
FIG. 9 illustrates a sectional side view of another example of the device.

FIG. 9 illustrates a device 900 substantially similar to the device 200 shown of FIGS. 2A, 2B and 2C. A main body 901 defines a longitudinal axis "LA3" along its length "LM3". In the illustrated example, a plurality of stepped sections 950 are only present on an inner surface 902 of the main body 901. An outer surface 904 of the main body 901 is smooth and does not include stepped sections. The outer surface 904 of the main body 901 is cone-shaped along its length "LM3" and diverges from a first end 910 toward a second end 920. However, in some other examples, the outer surface 904 may include any geometry to match aerodynamic requirements of the vehicle 100 (shown in FIG. 1). In some examples, the outer surface 904 may have a circular, an oval, a square, a rectangular, a triangular, or a polygonal cross-section. However, the inner surface 902 includes the plurality of stepped sections 950 irrespective of a geometry of the outer surface 904. In some cases, the outer surface 904 may include some hooks, eyes or similar fastening means for fixation purposes.

Each stepped section 950 of the plurality of stepped sections 950 includes two edges 952 and 954. Further, the inner surface 902 of the main body 901 includes one additional edge 952 extending from the first end 910 and disposed adjacent to one of the plurality of stepped sections 950.

In order to remove any contaminants from an interior cavity 930 of the device 900, the main body 901 further defines a plurality of apertures 940 therethrough between the first end 910 and the second end 920. In some examples, the plurality of apertures 940 are arranged in a plurality of circumferential rows spaced apart from each other along the length "LM3" of the main body 901.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

LIST OF NUMBERS

100 Vehicle
102 Image Acquisition Unit/Vehicle-Mounted Image Acquisition Unit
200 Device
201 Main Body
202 Inner Surface
204 Outer Surface
210 First End
220 Second End 230 Interior Cavity
250 Plurality Of Stepped Sections
252 Edge
254 Edge
LM Length
W1 First Width
W2 Second Width
A1 Angle
A2 Angle
A3 Angle
LS Length
HS Height
240 Plurality Of Apertures
245 Plurality Of Circumferential Rows
300 Image Acquisition System
LA Longitudinal Axis
HA Aperture Axis
400 Device
401 Main Body
410 First End
420 Second End
430 Interior Cavity
LM1 Length
402 Inner Surface
404 Outer Surface
450 Plurality Of Stepped Sections
452 Edge
454 Edge
440 Plurality Of Apertures
445 Plurality Of Circumferential Rows
LA1 Longitudinal Axis
HA1 Aperture Axis
A4 Angle
500 Device
501 Main Body
510 First End
520 Second End
530 Interior Cavity
LM2 Length
502 Inner Surface
504 Outer Surface
550 Plurality Of Stepped Sections
552 Edge
554 Edge
540 Plurality Of Apertures
545 Plurality Of Circumferential Rows
LA2 Longitudinal Axis
HA2 Aperture Axis
A5 Angle
LH Length
240a Aperture
240b Aperture
240c Aperture
615 Attachment Portion
610 Adhesive Layer
620 Mounting Tabs Or Flanges
625 Apertures
630 Threaded Portion/External Threaded Portion
640 Bayonet Type Mounting Mechanism
641 Attachment Portion
645 Radial Pins
650 Mount Ring
651 Attachment Portion
FOV Field Of View
OE Outside Environment
SL Stray Light
AF Airflow
800 Flow Unit
810 Controller
820 Hose
830a Nozzle
830b Nozzle
840 Valve
850 Valve
900 Device
901 Main Body
910 First End
920 Second End
930 Interior Cavity
902 Inner Surface
904 Outer Surface
950 Plurality of Stepped Sections
952 Edge
954 Edge
940 Plurality Of Apertures
LM3 Length
LA3 Longitudinal Axis

The invention claimed is:

1. A device for use with a vehicle-mounted image acquisition unit, the device comprising:
a main body including a first end and a second end opposite to the first end, wherein the main body further defines:
an interior cavity extending between the first end and the second end;
a longitudinal axis extending through the interior cavity; and
a plurality of apertures therethrough between the first end and the second end, each of the plurality of apertures including an aperture axis extending through the aperture, at least one of the aperture axes inclined relative to the longitudinal axis; and
wherein the first end of the main body is configured to be disposed at or near the vehicle mounted image acquisition unit, the vehicle-mounted image acquisition unit having a field of view extending through the interior cavity and through the second end to an outside environment surrounding a vehicle.

2. The device according to claim 1, wherein the main body is substantially cone-shaped such that the main body diverges from the first end toward the second end.

3. The device according to claim 1, wherein the plurality of apertures are arranged in a plurality of circumferential rows spaced apart from each other along a length of the main body.

4. The device according to claim 1, wherein the main body further includes a plurality of stepped sections disposed adjacent to each other.

5. The device according to claim 4, wherein the plurality of stepped sections are defined on an inner surface of the main body.

6. The device according to claim 1, wherein each aperture axis is inclined relative to the longitudinal axis of the main body.

7. The device according to claim 1, wherein at least one aperture from the plurality of apertures is cone-shaped along its length.

8. The device according to claim 1, wherein each aperture has a circular cross-section.

9. The device according to claim 1, wherein the first end of the main body is secured to the vehicle-mounted image acquisition unit by at least one of adhesive, fasteners and a ring mount.

10. The device according to claim 1, further comprising a flow unit configured to generate flow of a fluid within the interior cavity such that the fluid is discharged through the plurality of apertures.

11. The device according to claim 1, wherein the main body comprises a material including at least one of glass-filled nylon, nylon 66, polycarbonate (PC), acrylonitrile butadiene styrene (ABS) and polycarbonate-acrylonitrile butadiene styrene (PC-ABS).

12. An image acquisition system for use with a vehicle, the image acquisition system comprising:
   an image acquisition unit mounted on the vehicle; and
   a device comprising a main body, the main body including
      a first end and a second end opposite to the first end, wherein the main body further defines:
         an interior cavity extending between the first end and the second end;
         a longitudinal axis extending through the interior cavity; and
         a plurality of apertures therethrough between the first end and the second end, each of the plurality of apertures including an aperture axis extending through the aperture, at least one of the aperture axes inclined relative to the longitudinal axis; and
      wherein the first end of the main body is configured to be disposed at or near the image acquisition unit, the image acquisition unit having a field of view extending through the interior cavity and through the second end to an outside environment surrounding the vehicle.

13. The image acquisition system according to claim 12, wherein the image acquisition unit comprises at least one of cameras, sensors, image sensors, optical sensors, laser sensors and scanners.

14. The image acquisition system according to claim 12, wherein the main body is substantially cone-shaped such that the main body diverges from the first end toward the second end.

15. The image acquisition system according to claim 12, wherein the plurality of apertures are arranged in a plurality of circumferential rows spaced apart from each other along a length of the main body.

16. The image acquisition system according to claim 12, wherein the main body further includes a plurality of stepped sections disposed adjacent to each other.

17. The image acquisition system according to claim 12, wherein each aperture axis is inclined relative to the longitudinal axis of the main body.

18. The image acquisition system according to claim 12, wherein at least one aperture from the plurality of apertures is cone-shaped along its length.

19. The image acquisition system according to claim 12, wherein the first end of the main body is secured to the image acquisition unit by at least one of adhesive, fasteners and a ring mount.

20. A device for use with a vehicle-mounted image acquisition unit, the device comprising:
   a main body including a first end, a second end opposite to the first end and a plurality of stepped sections disposed between the first end and the second end, wherein the main body further defines:
      an interior cavity extending between the first end and the second end;
      a longitudinal axis extending through the interior cavity; and
      a plurality of apertures therethrough between the first end and the second end, each of the plurality of apertures including an aperture axis extending through the aperture, at least one of the aperture axes inclined relative to the longitudinal axis; and
   wherein the first end of the main body is configured to be secured to the vehicle-mounted image acquisition unit, the vehicle-mounted image acquisition unit having a field of view extending through the interior cavity and through the second end to an outside environment surrounding a vehicle.

21. A device for use with a vehicle-mounted image acquisition unit, the device comprising:
   a main body including a first end, a second end opposite to the first end, and a plurality of stepped sections disposed on an interior of the device between the first end and the second end, each of the plurality of stepped sections including a step surface, wherein the main body further defines:
      an interior cavity extending between the first end and the second end;
      a longitudinal axis extending through the interior cavity; and
      a plurality of apertures therethrough between the first end and the second end, each of the plurality of apertures including an aperture axis extending through the aperture, at least one of the aperture axes inclined relative to at least one of the step surfaces;
   wherein the first end of the main body is configured to be secured to the vehicle-mounted image acquisition unit, the vehicle-mounted image acquisition unit having a field of view extending through the interior cavity and through the second end to an outside environment surrounding a vehicle.

\* \* \* \* \*